US012105664B2

(12) United States Patent
Hirouchi

(10) Patent No.: US 12,105,664 B2
(45) Date of Patent: Oct. 1, 2024

(54) IMAGE PROCESSING APPARATUS HAVING USB HOST CONTROLLER, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Yasuo Hirouchi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 17/958,684

(22) Filed: Oct. 3, 2022

(65) Prior Publication Data
US 2023/0132909 A1 May 4, 2023

(30) Foreign Application Priority Data
Nov. 2, 2021 (JP) ................................ 2021-179599

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
None
See application file for complete search history.

(56) References Cited

U.S. PATENT DOCUMENTS

| 8,862,822 | B2 | 10/2014 | Koga | |
|---|---|---|---|---|
| 9,922,510 | B2* | 3/2018 | Pavlich | H04W 4/023 |
| 2010/0281185 | A1* | 11/2010 | Takayama | G06F 1/3278 |
| | | | | 713/323 |
| 2012/0042099 | A1* | 2/2012 | Wong | G06F 21/606 |
| | | | | 710/316 |
| 2018/0284997 | A1* | 10/2018 | Dalmatov | G11C 16/349 |
| 2018/0351744 | A1* | 12/2018 | Ogle | H04W 12/126 |

FOREIGN PATENT DOCUMENTS

| JP | 2009146061 A | 7/2009 |
|---|---|---|
| JP | 2009266112 A | 11/2009 |
| JP | 2010050564 A | 3/2010 |
| JP | 2010198112 A | 9/2010 |

* cited by examiner

*Primary Examiner* — Henry Tsai
*Assistant Examiner* — Dean Phan
(74) *Attorney, Agent, or Firm* — ROSSI, KIMMS & McDOWELL LLP

(57) ABSTRACT

An image processing apparatus that is capable of extending a function while guaranteeing performance and quality. The image processing apparatus has a USB host controller. A first USB host interface is installed inside the image processing apparatus. A storage unit stores device information about a USB storage device that can be used as a system storage device of the image processing apparatus. A memory device stores a set of instructions. A processor executes the set of instructions to obtain individual identification information about a USB storage device from the USB storage device in a case where the USB storage device is connected to the first USB host interface, and control to achieve a state where the USB storage device is available as the system storage device of the image processing apparatus in a case where the individual identification information is in the device information.

11 Claims, 11 Drawing Sheets

| USB Vendor ID | USB Product ID |
|---|---|
| 0x04a9 | 0x1234 |
| ~ | ~ |
| 0x04a9 | 0x9876 |

FIG. 6

| Function | Cache | Reservation Print | Media Direct |
|---|---|---|---|
| Internal Storage Device (System Storage Device) /mnt/media/internal/sda1 | OK | OK | NG |
| External Storage Device (User Storage Device) /mnt/media/external/sda1 | NG | NG | OK |

IMAGE PROCESSING APPARATUS HAVING USB HOST CONTROLLER, CONTROL METHOD THEREFOR, AND STORAGE MEDIUM STORING CONTROL PROGRAM THEREFOR

BACKGROUND OF THE INVENTION

Field of the Invention

The present invention relates to an image processing apparatus having a USB host controller, a control method therefor, and a storage medium storing a control program therefor.

Description of the Related Art

There is a known image processing apparatus like an MFP that is equipped with an SATA (a serial ATA) controller etc. in order to enable use of mass storage devices (large capacity memory devices), such as an SSD and an HDD. In contrast, an image processing apparatus that is equipped with an eMMC as a storage device without mounting an SATA controller is also known.

Such an image processing apparatus may need to expand memory capacity of a storage device in order to extend a function. At this time, if memory capacity of an eMMC is increased or an additional eMMC is implemented in an image processing apparatus that is equipped with an eMMC without mounting an SATA controller, revision of a control substrate is needed, which incurs large cost. Against this, if an image processing apparatus is provided with a USB host interface (referred to as a "USB host I/F") and a USB host controller implemented on a main control substrate, a USB storage device can be connected easily to increase memory capacity.

For example, a USB storage device, which is a system for extending a function of an image processing apparatus, may be used as a cache area of an OS or as a saving space for a file of reservation print. In such cases, when the USB storage device is removed from the image processing apparatus during operation of a system, the system may stop working normally. Accordingly, the USB storage device for extending a function is preferably installed in a position where unintended (careless) removal during operation of a system is prevented. Accordingly, the USB host I/F to which the USB storage device is connected is preferably installed in a position inside the image processing apparatus that is covered with a lid (an exterior member) like a decorative panel, for example.

Moreover, when an image processing apparatus is provided with an internal USB host I/F installed inside the apparatus and an external USB host I/F installed outside the apparatus, an OS needs to determine whether a storage device is connected to the internal USB host I/F or the external USB host I/F. For example, in a case where the OS is Linux (registered trademark), when the OS is notified of the drive name (for example, "/dev/sda1") of the connected USB storage device, the OS refers to a file under "/proc". At this time, a port number of the USB host I/F is determined uniquely. Accordingly, the OS can determine whether the USB storage device of the notified drive name has been connected to the internal USB host I/F or the external USB host I/F (see Japanese Laid-Open Patent Publication (Kokai) No. 2009-266112 (JP 2009-266112A)).

The technique described in the above-mentioned publication determines a USB host I/F to which the USB storage device of the drive name has been connected by referring to the drive name assigned from the OS and a file under "/proc". Then, information that associates the port number of the internal USB host I/F with the drive name of the connected USB storage device is mounted to a system mount path, and the connected USB storage device is used as a system storage device.

However, when a memory capacity of the USB storage device connected to the internal USB host I/F as a system storage device is small or an access speed thereof is slow, performance of the image processing apparatus cannot sufficiently be exhibited. Moreover, when a USB storage device that is not subjected to performance measurement for guaranteeing performance and quality of an image processing apparatus is connected, performance of the image processing apparatus cannot sufficiently be exhibited.

SUMMARY OF THE INVENTION

The present invention provides an image processing apparatus that is capable of extending a function while guaranteeing performance and quality.

Accordingly, a first aspect of the present invention provides an image processing apparatus having a USB host controller, the image processing apparatus including a first USB host interface configured to be installed inside the image processing apparatus, a storage unit configured to store device information about a USB storage device that can be used as a system storage device of the image processing apparatus, a memory device that stores a set of instructions, and at least one processor that executes the set of instructions to obtain individual identification information about a USB storage device from the USB storage device in a case where the USB storage device is connected to the first USB host interface, and control to achieve a state where the USB storage device is available as the system storage device of the image processing apparatus in a case where the individual identification information is in the device information.

According to the present invention, the image processing apparatus that is capable of extending a function while guaranteeing performance and quality is achieved.

Further features of the present invention will become apparent from the following description of exemplary embodiments with reference to the attached drawings.

BRIEF DESCRIPTION OF THE DRAWINGS

FIG. 5 is a view showing an example of a device information list.

FIG. 6 is a view describing functions that are available by USB storage devices.

DESCRIPTION OF THE EMBODIMENTS

Figure 1:
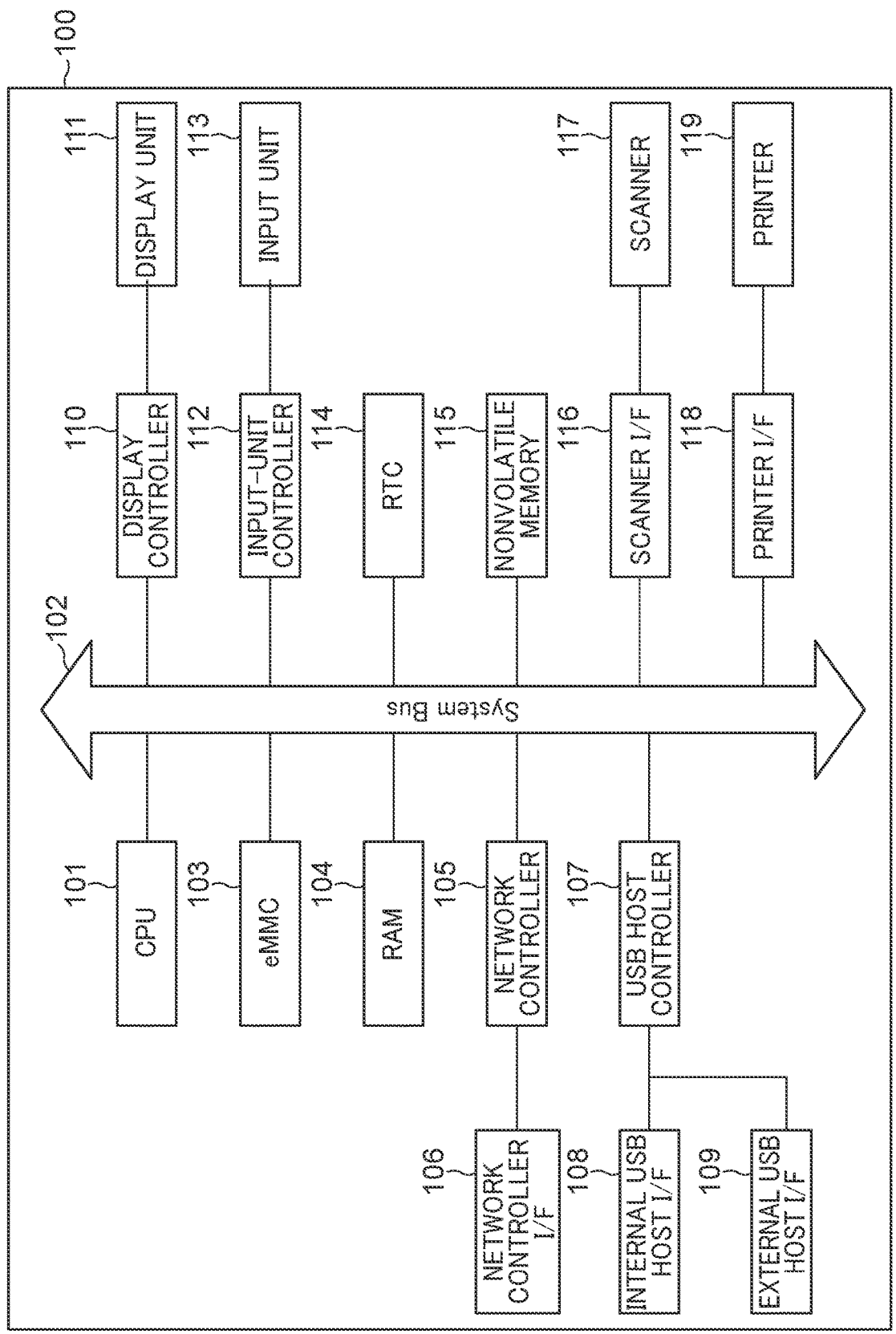
FIG. 1 is a block diagram schematically showing a hardware configuration of an image pickup apparatus according to an embodiment of the present invention.

Hereafter, embodiments according to the present invention will be described in detail by referring to the drawings. [0012] FIG. 1 is a block diagram schematically showing a hardware configuration of an image pickup apparatus 100 according to an embodiment of the present invention. The image processing apparatus 100 is provided with a central processing unit (CPU) 101, an eMMC 103, a RAM 104, a network controller 105, and a network controller I/F 106. Moreover, the image processing apparatus 100 is provided with a USB host controller 107, an internal USB host I/F 108, an external USB host I/F 109, a display controller 110, a display unit 111, an input-unit controller 112, and an input unit 113. Furthermore, the image processing apparatus 100 is provided with at real time clock (RTC) 114, a nonvolatile memory 115, a scanner I/F 116, a scanner 117, a printer I/F 118, and a printer 119. These units are communicably connected through a system bus 102.

The CPU 101 controls entire operations of the image processing apparatus 100 by running software for operating the image processing apparatus 100. The eMMC 103 stores software required for operating the image processing apparatus 100, a database, a temporary storage file, etc. The RAM 104 is used as a workspace to which a program for operating the image processing apparatus 100 is developed, and stores variables used in running the program and data transferred by DMA (Dynamic Memory Access) from other units. The network controller 105 communicates with an apparatus (not shown) on a network. The network controller I/F 106 communicably connects the apparatus (not shown) on the network with the network controller 105.

The USB host controller 107 controls a USB storage device connected to the image processing apparatus 100 under control of the CPU 101. Each of the internal USB host I/F 108 and external USB host I/F 109 communicably connects a USB storage device with the image processing apparatus 100. Installation positions of the internal USB host I/F 108 and external USB host I/F 109 will be described by referring to FIG. 2. The display unit 111 displays an operation situation, etc. about the image processing apparatus 100. The display controller 110 controls display of the display unit 111. The input unit 113 receives an input instruction of a user to the image processing apparatus 100. The input-unit controller 112 controls the input unit 113. The input unit 113 may include a keyboard, a mouse, a ten key pad, a cursor key, a touch panel, an operation-unit keyboard, for example. The touch panel is physically implemented on a surface of the display unit 111.

The RTC 114 is a time counting unit that has a clock function, an alarm function, a timer function, etc. of the image processing apparatus 100. The nonvolatile memory 115 is a rewritable storage medium that has not mass storage capacity and is other than the eMMC 103. It should be noted that the nonvolatile memory 115 may be an SRAM, an EEPROM, or the like. The scanner 117 reads a document (a sheet surface) and generates image data. The scanner I/F 116 connects the scanner 117 to the system bus 102, and enables control of the scanner 117 by the CPU 101. The printer 119 performs a print process that forms an image on a sheet. The printer I/F 118 connects the printer 119 to the system bus 102, and enables control of the printer 119 by the CPU 101.

Figure 2:
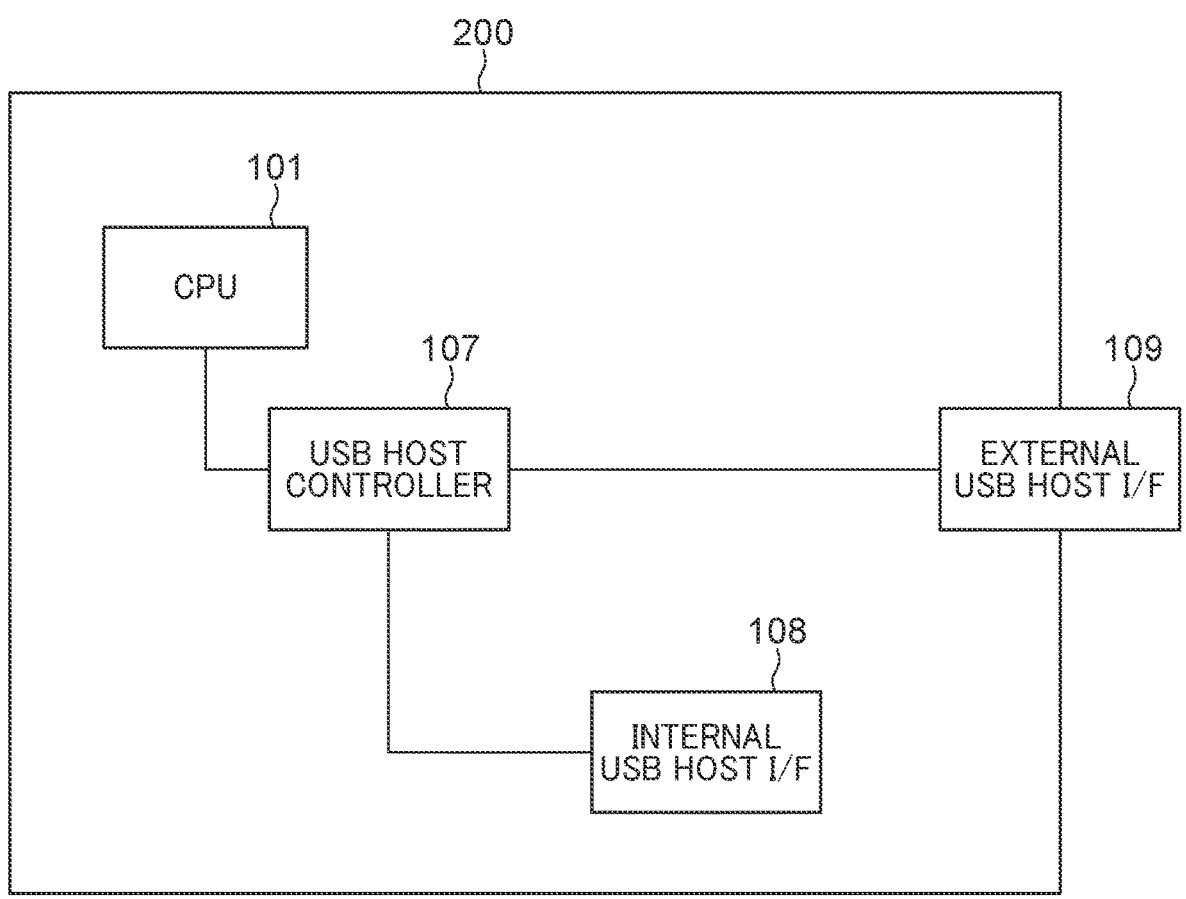
FIG. 2 is a schematic view showing installation positions of USB host I/Fs in a housing of the image processing apparatus.

FIG. 2 is a schematic view showing installation positions of the internal USB host I/F 108 and external USB host I/F 109 in a housing 200 of the image processing apparatus 100. An exterior member, such as a decorative plate, is fixed to the outside of the housing 200 of the image processing apparatus 100 by screws. A user or an administrator (hereinafter referred to as a "operator") of the image processing apparatus 100 needs to detach the screws and the exterior member, when performing a manual operation to the inside of the housing 200.

The internal USB host I/F 108 (a first USB host interface) is installed at a position that is protected by the detachable exterior member like the decorative plate in the housing 200. Accordingly, unless detaching the exterior member, the operator cannot access to the internal USB host I/F 108 (i.e., the operator cannot insert a USB device into the internal USB host I/F 108 and cannot remove the USB device from the internal USB host I/F 108). A main body of a USB device like a USB storage device connected to internal USB host I/F 108 is installed inside the housing 200. Thereby, in a normal use state in which the exterior member is attached to the housing 200, careless removal of the USB device connected to the internal USB host I/F 108 can be prevented.

In the meantime, the external USB host I/F 109 (a second USB host interface) is installed at a position that allows direct access from the outside of the housing 200. Accordingly, in the normal use state of the image processing apparatus 100 in which the exterior member is attached to the housing 200, the operator can directly insert a USB device like a USB storage device into the external USB host I/F 109 from the outside and can directly remove the USB device from the external USB host I/F 109 from the outside without detaching the exterior member. The main body of the USB storage device connected to external USB host I/F 109 is installed in the outside of the image processing apparatus 100.

Figure 3:
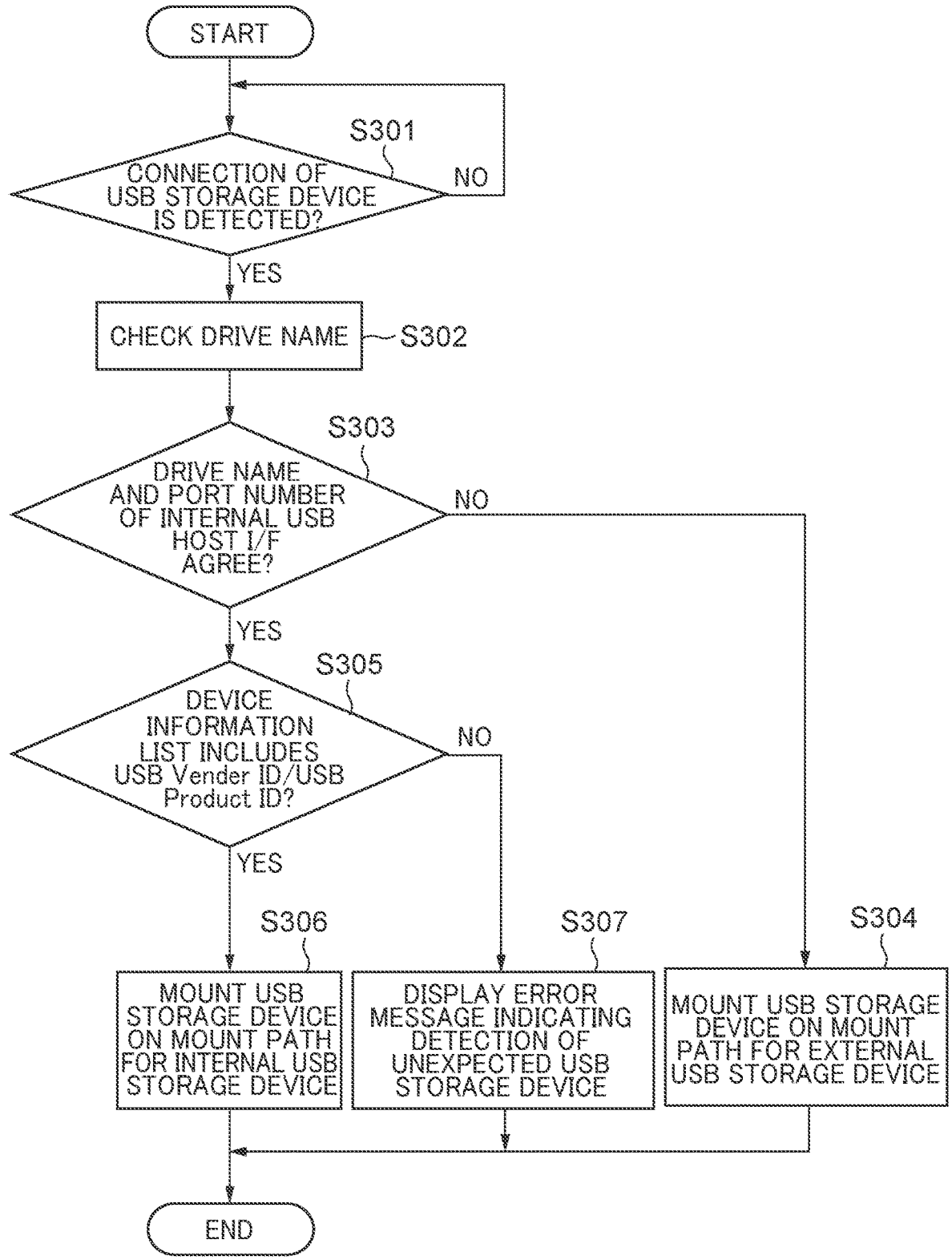
FIG. 3 is a flowchart describing motion control in a first embodiment in a case where a USB storage device is connected to the image processing apparatus.

FIG. 3 is a flowchart describing motion control in a first embodiment in a case where a USB storage device is connected to the image processing apparatus 100. Each process (step) indicated by an S-number in the flowchart in FIG. 3 is achieved because the CPU 101 develops a predetermined program stored in the eMMC 103 to the RAM 104 and runs it.

In S301, the CPU 101 determines whether connection of a USB storage device is detected. When determining that connection of a USB storage device is not detected (NO in S301), the CPU 101 repeats the determination in S301. When determining that connection of a USB storage device is detected (YES in S301), the CPU 101 proceeds with the process to S302.

Figure 4:
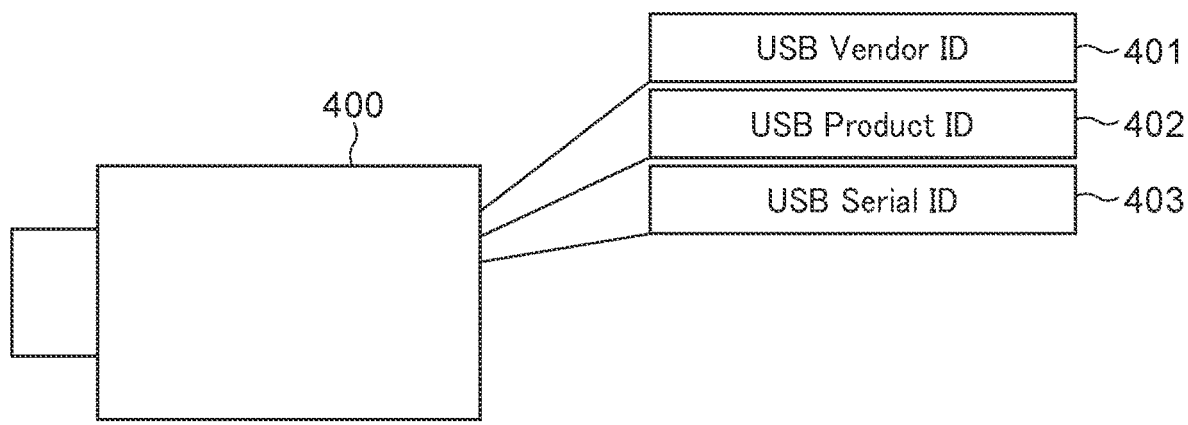
FIG. 4 is a schematic view describing ID information held by a USB storage device.

Hereinafter, a method of detecting connection of a USB storage device will be described. FIG. 4 is a schematic view describing ID information held by a USB storage device 400. The USB storage device 400 holds a USB vendor ID 401, USB product ID 402, and USB serial ID 403 as individual identification information. Features of the USB storage device 400 can be specified on the basis of these three IDs.

The USB vendor ID 401 specifies a manufacturing company of the USB device. The USB vendor ID 401 is issued from the organization (USB.org) that presides over the USB standard. The same ID cannot be used by other companies. The USB product ID 402 is issued for every product model to identify a model of a product manufactured in the manufacturing company having the same USB vendor ID 401. The manufacturing company and product model can be specified on the basis of the USB vendor ID 401 and USB product ID 402. The USB serial ID 403 is given for every product to identify a unique product having the same USB vendor ID 401 and the same USB product ID 402. It should be noted that the USB serial ID 403 may not be used approximately in the present invention.

When the USB storage device 400 is connected to the internal USB host I/F 108 or external USB host I/F 109, the CPU 101 requests the USB storage device 400 to transmit the individual identification information by a GET_DE-SCRIPOR command through the USB host controller 107. In response to this, the USB storage device 400 answers the information about the USB vendor ID 401, USB product ID 402, and USB serial ID 403.

The description is referred back to the flowchart in FIG. 3. In S302, the CPU 101 checks drive information issued within the system. In this example, the drive information (drive name) of the connected USB storage device shall be "/dev/sdal". In S303, the CPU 101 checks a file under "/sys/bus/USB/devices" and determines whether the drive name "/dev/sdal" and the port number of the internal USB host I/F 108 agree. When determining that the drive name and the port number do not agree (No in S303), the CPU 101 proceeds with the process to S304.

In S304, the CPU 101 mounts the connected USB storage device to an external USB storage mount path to turn the device into available state. And then, the CPU 101 finishes this process. It should be noted that the mount path to be mounted in the process in S304 shall be "/mnt/media/external/sdal", for example.

When determining that the drive name and the port number of the internal USB host I/F 108 agree in S303 (YES in S303), the CPU 101 proceeds with the process to S305. In S305, the CPU 101 obtains the USB vendor ID 401 and USB product ID 402 of the USB storage device connected to the internal USB host I/F 108 from the USB storage device. Then, the CPU 101 determines whether the USB vendor ID 401 and USB product ID 402 obtained from the USB storage device are included in a device information list in which pieces of information about USB storage devices that conform to the performance and quality of the image processing apparatus 100 are registered.

FIG. 5 is a view showing an example of the device information list 500. The equipment information list 500 includes USB vendor IDs and USB product IDs. The equipment information list 500 is included in a program of firmware that is stored in the eMMC 103. In order to exhibit the function and performance of the image processing apparatus 100 more than enough, predetermined performance is required to the USB storage device. Although the performance is defined by memory capacity and an access speed in this example, features that define the performance are not restricted to them.

The CPU 101 performs enumeration of USB, when a USB storage device is connected to the internal USB host I/F 108 or external USB host I/F 109. The CPU 101 determines whether the USB vendor ID 401 and USB product ID 402 included in the response to the GET DESCRIPTOR command issued during the enumeration are included in the device information list 500.

When determining that the USB vendor ID 401 and USB product ID 402 are included in the device information list 500 (YES in S305), the CPU 101 proceeds with the process to S306. In S304, the CPU 101 mounts the connected USB storage device to an internal USB storage mount path to turn the device into available state. And then, the CPU 101 finishes this process. It should be noted that the mount path to be mounted in the process in S306 shall be "/mnt/media/internal/sdal", for example.

FIG. 6 is a view describing functions that can be used with the USB storage device connected to the image processing apparatus 100. The USB storage device mounted on the internal USB storage mount path in S306 is used as a system storage device. Moreover, the USB storage device mounted on the external USB storage mount path in S304 is used as a user storage device but is not used as a system storage device. Although a cache function and a reservation print function can be used by the system storage device, they cannot be used by the user storage device. In the meantime, a medium direct function that prints a PDF file etc. stored in the USB storage device can be used by the user storage device, but it cannot be used by the system storage device.

When determining that the USB vendor ID 401 and USB product ID 402 are not included in the device information list 500 (NO in S305), the CPU 101 proceeds with the process to S307. In S307, the CPU 101 performs an error handling without mounting the connected USB storage device because the CPU 101 determines that an unexpected USB storage device is connected to the internal USB host I/F 108 (detection). And then the CPU 101 finishes this process. In the error handling, a warning screen is displayed on the display unit 111, for example. Voice warning may be used together with the warning screen. The warning screen is later mentioned by referring to FIG. 8.

Figure 7:
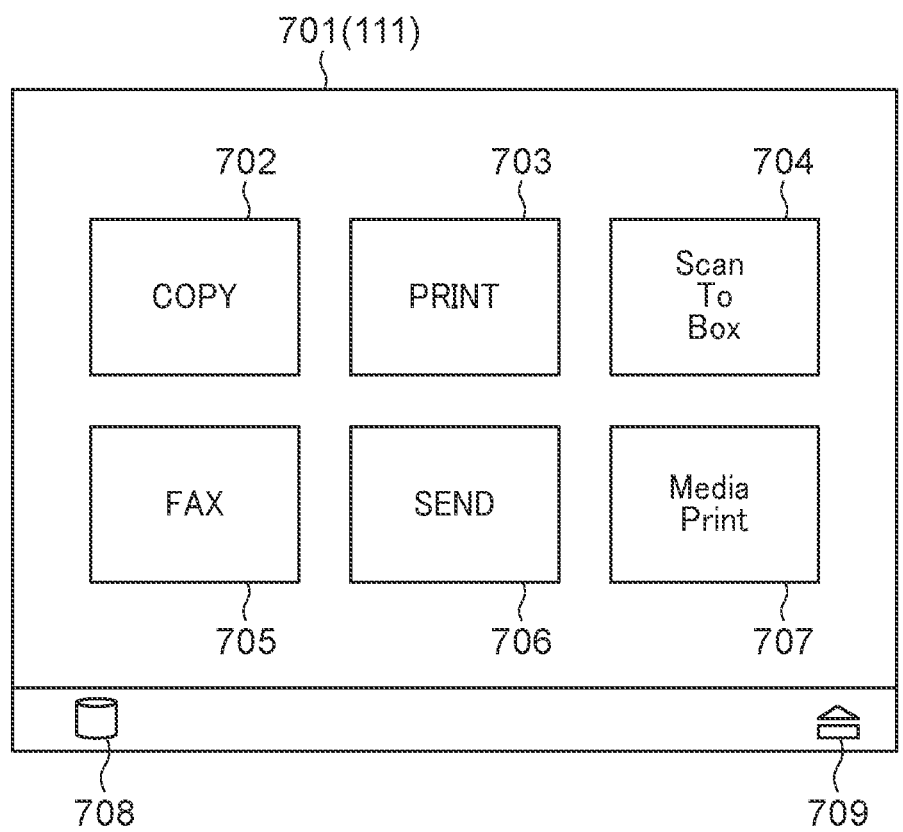
FIG. 7 is a view showing an example of a job input screen.

A display example on the display unit 111 is described before describing the warning screen in S307. FIG. 7 is a view showing an example of a display screen on the display unit 111 of the image processing apparatus 100, and shows a display example (hereinafter referred to as a "job input screen 701") in a job input waiting state. Eight icons 702 through 709 are displayed on the job input screen 701.

The icon 702 is tapped (touched) in performing a copy function. The icon 703 is tapped in performing reservation print etc. The icon 704 is tapped in performing a function to store an image read by the scanner 117 to the storage device. The icon 705 is tapped in performing a facsimile function in a case where the image processing apparatus 100 has the facsimile function. The icon 706 is tapped in performing a function to transmit image data (document data) etc. read by the scanner 117 to a predetermined device. The icon 707 is tapped in performing a function to print a PDL file etc. stored in the connected USB storage device.

The icon 708 is displayed only when the CPU 101 recognizes the connected USB storage device as the system storage device by the process in S306. The icon 709 is displayed only when the CPU 101 recognizes the connected USB storage device as the user storage device by the process in S305. When the icon 709 is tapped the display screen in FIG. 7 will vary to a screen (not shown) of a mount release process as a preparation of removal of the user storage device.

Figure 8:
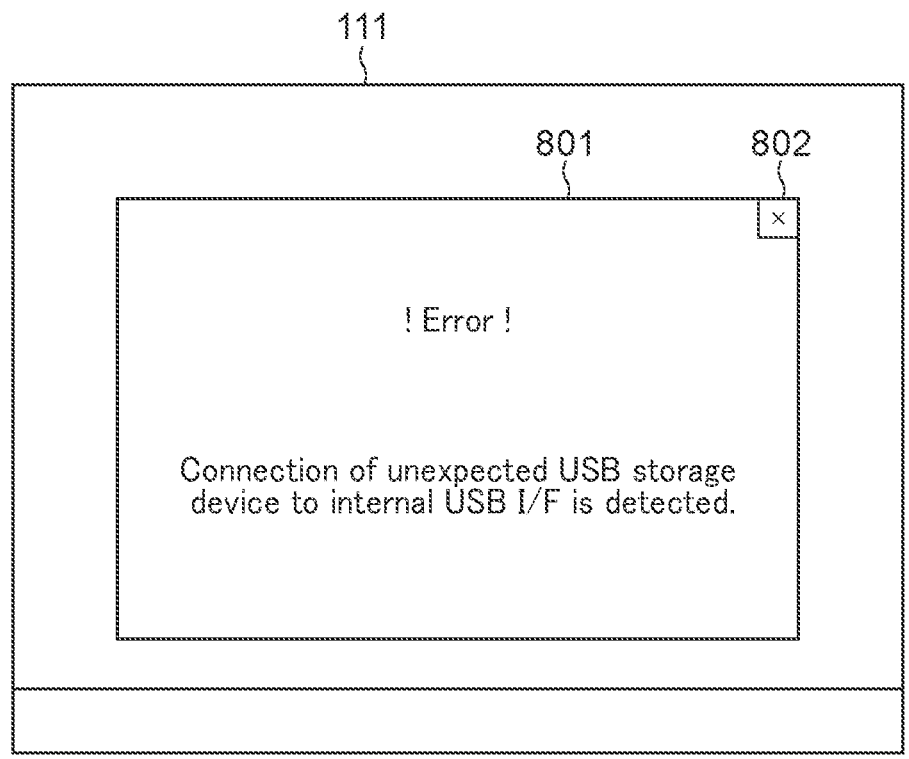
FIG. 8 is a view showing an example of a warning screen (an error message) displayed on a display unit in S307 in FIG. 3.

FIG. 8 is a view showing an example of the warning screen displayed on the display unit 111 in S307. In the warning screen displayed in S307, an error message showing that the USB storage device connected to the internal USB host I/F 108 cannot be used as the system storage device is displayed on the display unit 111. For example, an error message 801 "Connection of unexpected USB storage device to internal USB host I/F is detected." is displayed as shown in FIG. 8. The dialog of the error message 801 can be closed by tapping a close button 802 indicated by an x-mark.

A message notifying a user that the connected USB storage device is mounted on the external USB storage mount path may be displayed on the display unit 111 in performing the process in S304. Similarly, a message notifying a user that the connected USB storage device is mounted on the internal USB storage mount path may be displayed on the display unit 111 in performing the process in S306.

As mentioned above, when the process in accordance with the flowchart in FIG. 3 is performed, the USB storage device connected to the internal USB host I/F 108 becomes available as the system storage device suitably. As a result, the function of the image processing apparatus 100 is extensible while guaranteeing the performance and quality.

In the first embodiment, even if a USB storage device has enough performance to be used as the system storage device, it cannot be used as the system storage device when its individual identification information is not registered in the device information list 500. Accordingly, it is necessary to update the device information list 500 by updating the firmware in order to use such a USB storage device as the system storage device.

Against this, a method of connecting a USB storage device of which performance and quality are guaranteed as the system storage device on site without updating the firmware will be described in a second embodiment. It should be noted that the "site" means "a location (for example, offices of a government, a company, an association, etc.) where the image processing apparatus 100 is installed and is operating".

Figure 9:
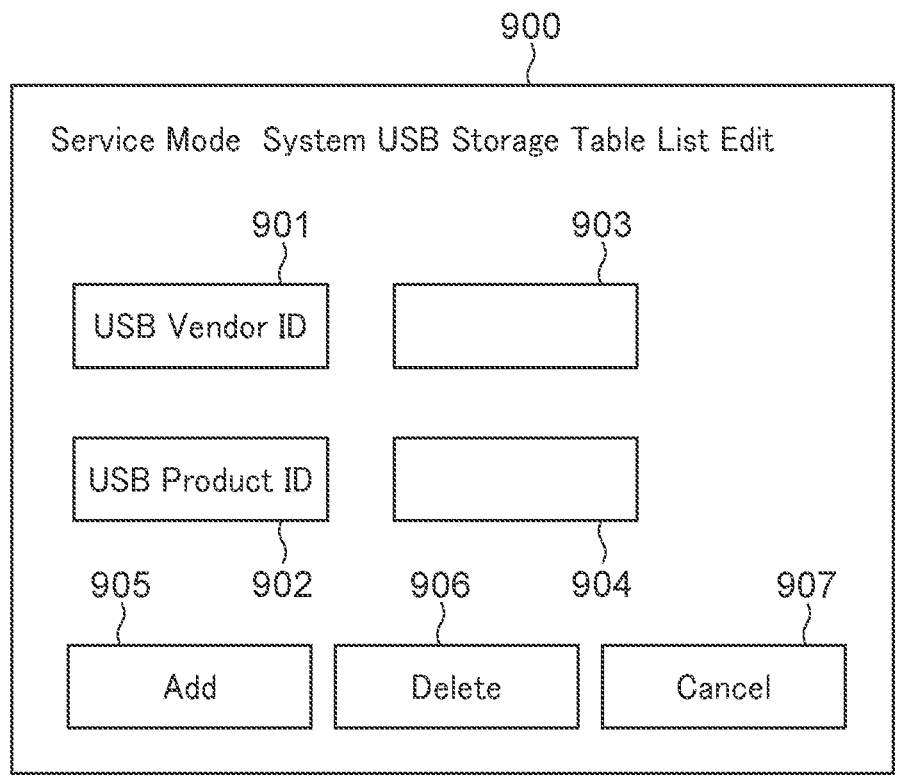
FIG. 9 is a view showing an example of a list edit screen.

FIG. 9 is a view showing an example of a list edit screen 900 that is displayed on the display unit 111 in adding information about a new system storage device (its performance and quality are guaranteed for the image processing apparatus 100) to the device information list 500. The list edit screen 900 is operated by a person who has predetermined authority, such as a risk manager who manages the image processing apparatus 100 or a service person who maintains the image processing apparatus 100.

A button 901 in the list edit screen 900 is tapped in editing the USB vendor ID 401. When the button 901 is tapped, input to a first display column 903, which is blank, becomes available, i.e., input of a new USB vendor ID 401 from the input unit 113 becomes available. A button 902 is tapped in editing the USB product ID 402. When the button 902 is tapped, input to a second display column 904, which is blank, becomes available, i.e., input of a new USB product ID 402 from the input unit 113 becomes available.

When an add button 905 is tapped after predetermined IDs are respectively input into the first display column 903 and second display column 904, the IDs respectively input into the first display column 903 and second display column 904 are added to the device information list 500. Ae delete button 906 is used to erase the IDs respectively displayed in the first display column 903 and second display column 904. When the add button 905 or the delete button 906 is tapped in a state where at least one of the IDs respectively input into the first display column 903 and second display column 904 is not a 4-digit hexadecimal number, an input error handling is performed, and then the list edit screen 900 is displayed again. The input error handling is a process to display an input error message, for example. When a cancel button 907 is pressed, the list edit screen 900 is closed and the job input screen 701 in FIG. 7 is displayed, for example. In this way, the USB vendor ID 401 and USB product ID 402 of the new USB storage device that can be used as the system storage device can be registered into the device information list 500 through the list edit screen 900.

If a false 4-digit hexadecimal number is registered into the device information list 500 due to an input mistake on the list edit screen 900, the false 4-digit hexadecimal number may point a real USB storage device that cannot be used as the system storage device. Moreover, ID information about a USB storage device that is unclear about whether it can be used as the system storage device may be carelessly registered into the device information list 500. In such cases, the image processing apparatus 100 in the first embodiment cannot execute operation while guaranteeing the performance and quality when a USB storage device that cannot be used as the system storage device essentially is mounted as the system storage device.

Furthermore, when the USB storage device that has the ID information registered in the device information list 500 is connected to the internal USB host I/F 108, the connected USB storage device is automatically available as the system storage device in the first embodiment. In the first embodiment, the propriety of use as the system storage device is determined only in comparison of the individual identification information of the USB storage device with the device information list 500. In this case, when a defect of a storage area, functional decline of data processing, or communication function decline occurs in the USB storage device that is actually connected to the internal USB host I/F 108, the image processing apparatus 100 cannot execute operation while guaranteeing the performance and quality. A process of a flowchart in FIG. 10 is executed so as to avoid these issues.

Figure 10:
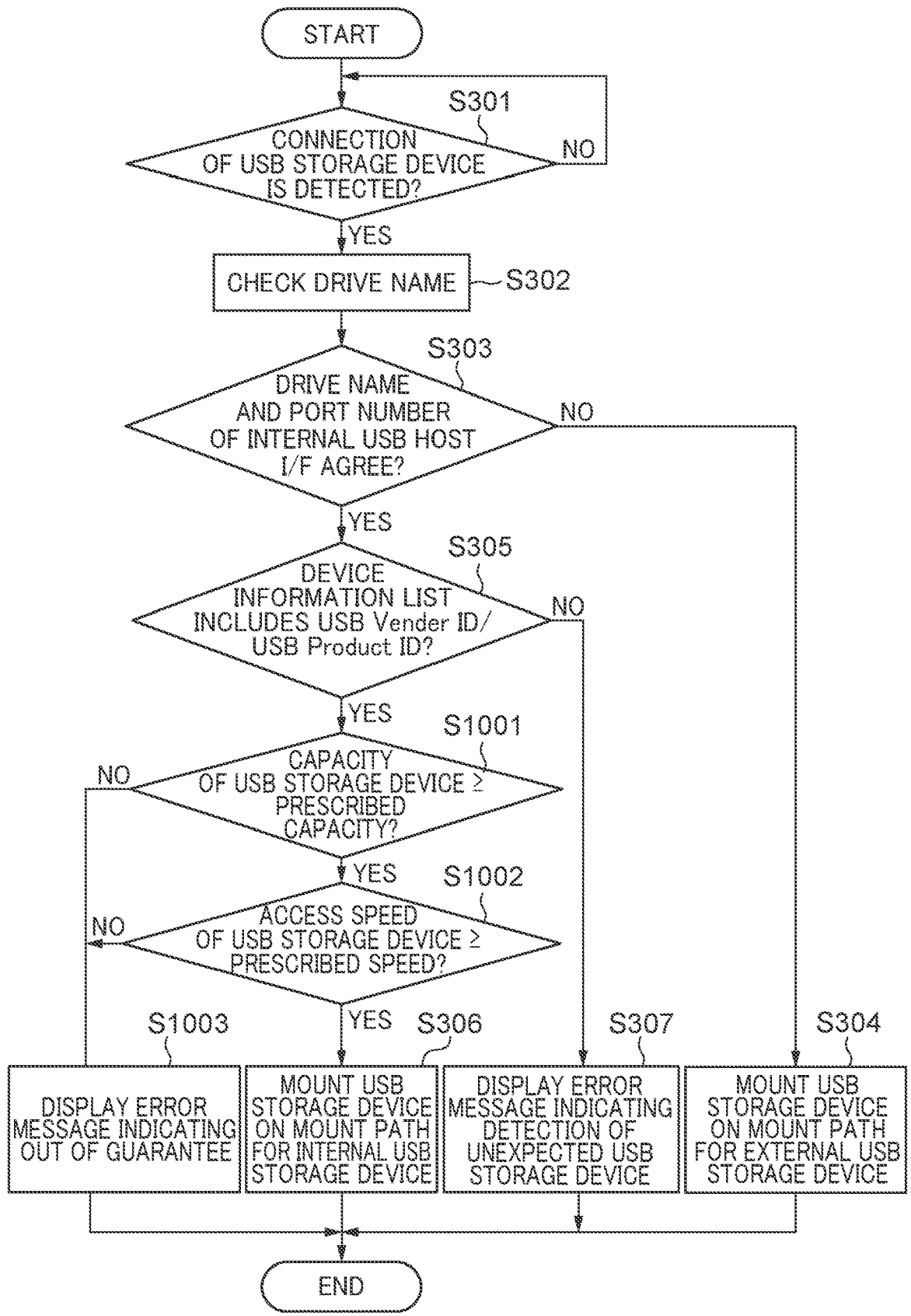
FIG. 10 is a flowchart describing a motion control in a second embodiment in a case where a USB storage device is connected to the image processing apparatus.

FIG. 10 is a flowchart describing motion control in a second embodiment in a case where a USB storage device is connected to the image processing apparatus 100. Each process (step) indicated by an S-number in the flowchart in FIG. 10 is achieved because the CPU 101 develops a predetermined program stored in the eMMC 103 to the RAM 104 and runs it.

In the flowchart in FIG. 10, a process (step) that is identical to a process in the flowchart in FIG. 3 is indicated by the same S-number and its description is omitted. Moreover, at the start of the process in S301, the update process of the device information list 500 by operation on the list edit screen 900 shall be completed.

After the process proceeds to S305 from the start, the process proceeds to an error handling in S307 when the determination in S305 becomes "NO" due to an input mistake of the USB vendor ID 401 and/or the USB product ID 402 in the list edit screen 900. For example, a USB storage device that is confirmed that it can be used as the system storage device shall be prepared, and the device information list 500 shall be updated by inputting the ID information about the USB storage device through the list edit screen 900. However, when the prepared USB storage device is actually connected to the internal USB host I/F 108, the determination in S305 may become "NO". In this case, since it is determined that the input mistake on the list edit screen 900 may be a cause, a state where the prepared USB storage device can be used as the system storage device is achievable by editing the device information list 500 through the list edit screen 900.

In the meantime, when it is determined that the USB vendor ID 401 and USB product ID 402 of the USB storage device connected to the internal USB host I/F 108 are included in the device information list 500 in S305 (YES in S305), the process proceeds to S1001.

As mentioned above, a USB storage device that cannot be used as the system storage device essentially or a USB storage device of which memory capacity or an access speed is lowered may be connected to the internal USB host I/F 108. The following processes in S1001, S1002, and 1003 are performed so that such a USB storage device will not be used as the system storage device.

In S1001, the CPU 101 determines whether the memory capacity of the connected USB storage device is equal to or more than (is not less than) prescribed memory capacity. When determining that the memory capacity of the connected USB storage device is equal to or more than the prescribed memory capacity (YES in S1001), the CPU 101 proceeds with the process to S1002.

In S1002, the CPU 101 determines whether the access speed of the connected USB storage device is equal to or more than (is not less than) a prescribed access speed. In executing the determination in S1002, the CPU 101 performs a READ/WRITE access test to the USB storage device and checks the access speed. When determining that the access speed of the connected USB storage device is equal to or more than the prescribed access speed (YES in S1002), the CPU 101 proceeds with the process to S306. As a result, the connected USB storage device can be used as the system storage device.

When determining that the memory capacity of the connected USB storage device is less than the prescribed memory capacity (NO in S1001) or when determining that the access speed of the connected USB storage device is less than the prescribed access speed (NO in S1002), the CPU 101 proceeds with the process to S1003. The CPU 101 performs the error handling in S1003 without mounting the connected USB storage device, and then finishes this process. In the error handling, a warning screen is displayed on the display unit 111, for example. Voice warning may be used together with the warning screen.

Figure 11:
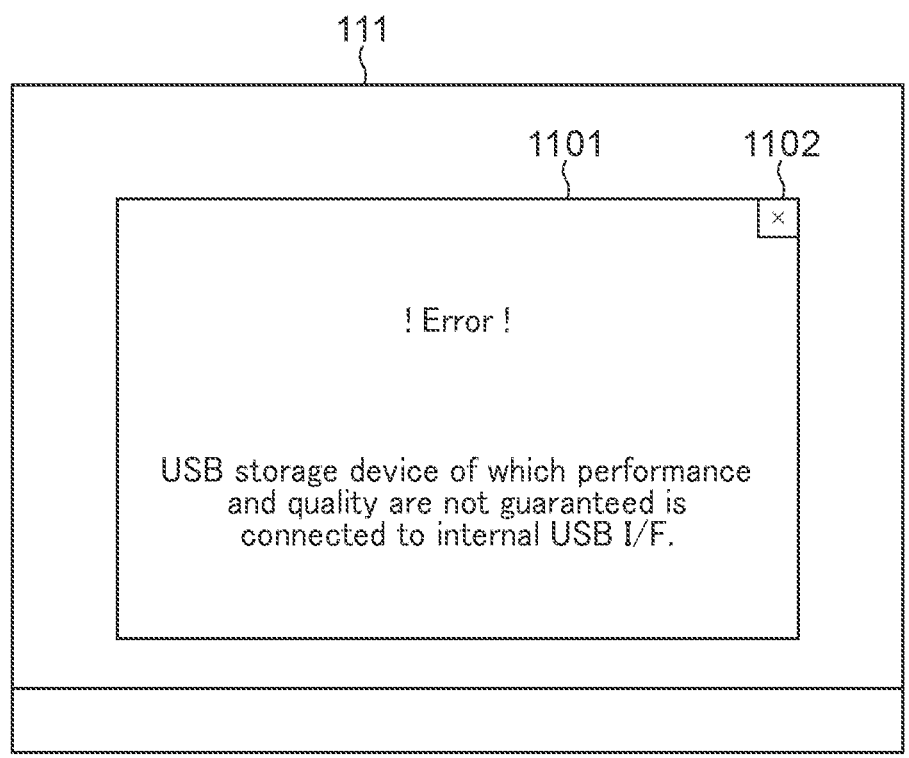
FIG. 11 is a view showing an example of a warning screen (an error message) displayed on the display unit in S1003 in FIG. 10.

FIG. 11 is a view showing an example of the warning screen displayed on the display unit 111 in S1003. An error message 1101 "USB storage device of which performance and quality are not guaranteed is connected to internal USB I/F." is displayed on the display unit 111. The dialog of the error message 1101 can be closed by tapping a close button 1102 indicated by an x-mark.

As mentioned above, the update of the device information list 500 and the execution of the process in accordance with the flowchart in FIG. 10 enable certain connection of a USB storage device of which the performance and quality are guaranteed as the system storage device without updating the firmware on site. Accordingly, the function of the image processing apparatus 100 is extensible while guaranteeing the performance and quality.

Although the present invention has been described in detail on the basis of the suitable embodiments, the present invention is not limited to these specific embodiments, and various configurations that do not deviate from the scope of the present invention are also included in the present invention. Furthermore, each embodiment mentioned above shows one embodiment of the present invention, and the embodiments can be combined suitably.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-179599, filed Nov. 2, 2021, which is hereby incorporated by reference herein in its entirety.

What is claimed is:

1. An image processing apparatus having a USB host controller, the image processing apparatus comprising:
a first USB host interface configured to be installed inside the image processing apparatus;
a storage unit configured to store device information about USB storage devices that can respectively be used as a system storage device of the image processing apparatus;
a memory device that stores a set of instructions; and
at least one processor that executes the set of instructions to:
obtain individual identification information about a USB storage device from the USB storage device in a case where the USB storage device is connected to the first USB host interface; and
control to achieve a state where the USB storage device is available as the system storage device, as opposed to a user storage device, of the image processing apparatus in a case where the individual identification information is in the device information.

2. The image processing apparatus according to claim 1, further comprising an input unit configured to add individual identification information about a new USB storage device to the device information,
wherein the at least one processor executes instructions in the memory device to:
determine whether memory capacity of a new USB storage unit is not less than prescribed memory capacity in a case where the new USB storage device is connected to the first USB host interface;
determine whether an access speed of the new USB storage unit is not less than a prescribed access speed in the case where the new USB storage device is connected to the first USB host interface; and control to achieve a state where the new USB storage device is available as the system storage device in a case where the memory capacity of the new USB storage unit is not less than the prescribed memory capacity and the access speed of the new USB storage unit is not less than the prescribed access speed.

3. The image processing apparatus according to claim 2, further comprising a display unit, wherein the at least one processor executes instructions in the memory device to display an error message showing that the new USB storage device cannot be used as the system storage device on the display unit in at least one of a case where the memory capacity of the new USB storage unit is less than the prescribed memory capacity and a case where the access speed of the new USB storage device is less than the prescribed access speed.

4. The image processing apparatus according to claim 3, wherein the at least one processor executes instructions in the memory device to display the error message on the display unit in a case where the individual identification information is not in the device information.

5. The image processing apparatus according to claim 1, further comprising a display unit, wherein the at least one processor executes instructions in the memory device to display an error message showing that the new USB storage device cannot be used as the system storage device on the display unit in a case where the individual identification information is not in the device information.

6. The image processing apparatus according to claim 1, wherein each of the device information and the individual identification information includes a USB vendor ID and a USB product ID of the USB storage device.

7. The image processing apparatus according to claim 1, further comprising a second USB host interface that is installed outside the image processing apparatus, wherein the at least one processor executes instructions in the memory device to control to bring into a state where a USB storage device connected to the second USB host interface is available as the user storage device and is not available as the system storage device.

8. The image processing apparatus according to claim 1, wherein the first USB host interface is installed at a position that is protected by a detachable exterior member that protects a housing of the image processing apparatus.

9. A control method for an image processing apparatus having a USB host controller, the control method comprising:

detecting connection of a USB storage device to a first USB host interface that is installed inside the image processing apparatus;

obtaining individual identification information about the USB storage device from the USB storage device in a case where the USB storage device is connected to the first USB host interface;

comparing the individual identification information with a device information list that is stored in a storage unit of the image processing apparatus as device information about USB storage devices that can respectively be used as a system storage device of the image processing apparatus; and controlling to achieve a state where the USB storage device is available as the system storage device, as opposed to a user storage device, of the image processing apparatus in a case where the individual identification information is in the device information.

10. A non-transitory computer-readable storage medium storing a control program causing a computer to execute a control method for an image processing apparatus having a USB host controller, the control method comprising:

detecting connection of a USB storage device to a first USB host interface that is installed inside the image processing apparatus;

obtaining individual identification information about the USB storage device from the USB storage device in a case where the USB storage device is connected to the first USB host interface;

comparing the individual identification information with a device information list that is stored in a storage unit of the image processing apparatus as device information about USB storage devices that can respectively be used as a system storage device of the image processing apparatus; and controlling to achieve a state where the USB storage device is available as the system storage device, as opposed to a user storage device, of the image processing apparatus in a case where the individual identification information is in the device information.

11. The image processing apparatus according to claim 1, wherein the state where the USB storage device is available as the system storage device is a state where the USB storage device is identified as an internal storage device, as opposed to an external storage device, of the image processing apparatus in the case where the individual identification information is in the device information.

* * * * *